PULSED DIFFERENTIAL COMPARATOR CIRCUIT

Filed Feb. 10, 1966

INVENTOR
JOHN C. STURMAN by [signature]
[signature]
ATTORNEYS 3,463,939
PULSED DIFFERENTIAL COMPARATOR CIRCUIT John C. Sturman, Fairview Park, Ohio, assignor to the United States of America as represented by the Administrator of the National Aeronautics and Space Administration Filed Feb. 10, 1966, Ser. No. 526,631
Int. Cl. H03k 5/20
U.S. Cl. 307—235 4 Claims

ABSTRACT OF THE DISCLOSURE

A comparator circuit is provided in which two nonvarying voltages to be compared are fed through a differential amplifier to respective ones of a pair of input transistors connected in a differential amplifier configuration. The emitter-collector circuits of the input transistors are connected through the emitter-collector circuits of respective ones of a pair of amplifying transistors and through a gate circuit to a D-C potential, the amplifying transistors serving as loads for the input transistors.

A first output is derived at a point between one of the input transistors and the amplifying transistor connected serially therewith. This output is applied across a dummy load and is also directed through feedback networks to the other input transistor and the other amplifying transistor. A second output is derived between the other input transistor and the other amplifying transistor. This second output is fed to a NAND circuit and is also directed through feedback networks to the one input transistor and the amplifying transistor connected therewith.

The invention described herein was made by an employee of the United States Government and may be manufactured and used by or for the Government of the United States of America for governmental purposes without the payment of any royalties thereon or therefor.

The present invention relates generally to comparator circuits and relates more particularly to circuits for comparing one input voltage to another to determine which is larger.

There are a number of prior electrical control devices which may be utilized for comparing voltages or currents. An example is a Schmitt trigger circuit which produces an output pulse when an input voltage is above a predetermined threshold value. The problem with the Schmitt trigger circuit and many of these prior compartor circuits is that there is not complete symmetry between the portions of the circuits associated with each input. The lack of symmetry contributes substantially to temperature drift between these portions of the circuit.

As will be seen, comparing the input signals differentially helps to cancel the drift and eliminates other problems occurring because of the lack of symmetry. However, there are very few prior circuits which are capable of comparing two voltages differentially and these few do not have good common mode rejection. Many of the prior circuits in addition have considerable hysteresis and still exhibit considerable drift with temperature change in spite of the differential comparison.

These systems are not entirely suitable, therefore, for use in satellites and other space vehicles, for example, which require low power consumption, low heat generation and high reliability. Finally, many of the prior comparator circuits are not compatible with digital type control systems which are highly reliable and are preferred for space vehicles and the like.

The present invention provides a comparator circuit which meets all these requirements. The present comparator circuit provides a true differential comparison of the input signals. The portions of the circuit associated with each input are perfectly symmetrical and cancel substantially the temperature drift of these circuit portions. The present comparator circuit provides sufficient common mode rejection so that its operation is not degraded by a 0.25 volt change in common-mode voltage.

In a preferred form, the inputs to the present comparator circuit are introduced to a differential amplifier section of the comparator circuit. The differential amplifier section provides gain and common mode rejection. Its perfect symmetry cancels substantially the temperature drift of its respective halves or sides.

The comparator circuit is normally de-energized and is energized to make a comparison only for the duration of an energizing control pulse introduced at a control pulse input. The input signals to be compared are allowed to settle in the comparator circuit for a short period before the circuit is energized.

Where two input signals are to be compared, each side of the comparator circuit includes effectively two amplifier sections connected to the opposite sides of the differential amplifier section and a feedback circuit from an output of each amplifier section to the opposite side input of the differential amplifier section. The outputs of the amplifier sections are the outputs of the comparator circuit.

The comparator circuit also operates similarly to a common mode, bistable multivibrator in that it will assume one of two stable states depending upon which input is larger. When the two signals to be compared are introduced and allowed to setttle in their respective sides of the differential amplifier section and the comparator circuit is energized, the particular input side of the differential amplifier section receiving the largest input signal will pass more current to its amplifier section so that its output signal is larger. The feedback circuit connecting this amplifier section to the input causes regeneration until finally its side of the differential amplifier is fully conducting and the other side is shut off. The comparator circuit is then stabilized with a voltage signal appearing at only one of the two outputs of the comparator circuit thereby indicating which input signal is the larger.

The present invention will be better understood by those skilled in the art from the following specification and the accompanying drawing in which.

Figures 1, 2:
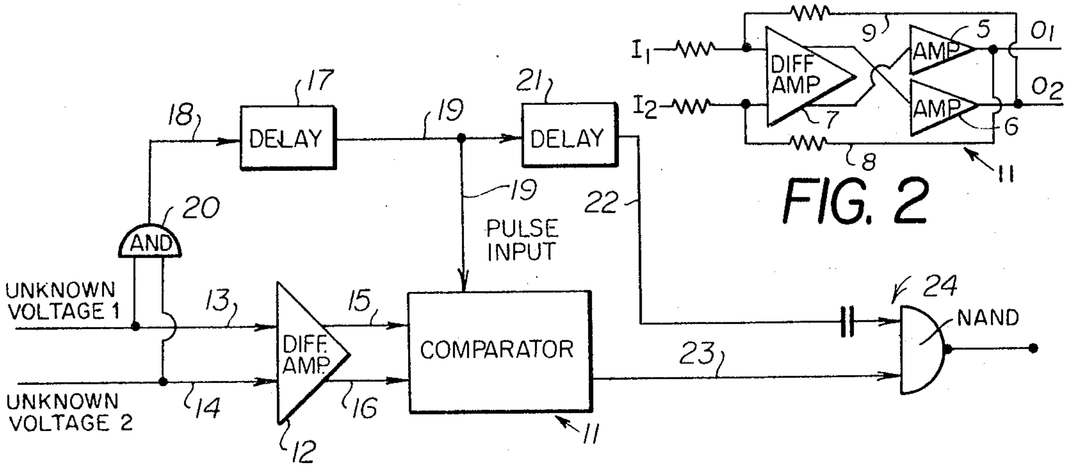
FIGURE 1 is a schematic diagram of a comparison system utilizing the comparator circuit of the present invention.
FIGURE 2 is a schematic representation of the comparator circuit of the present invention.
Figure 3:
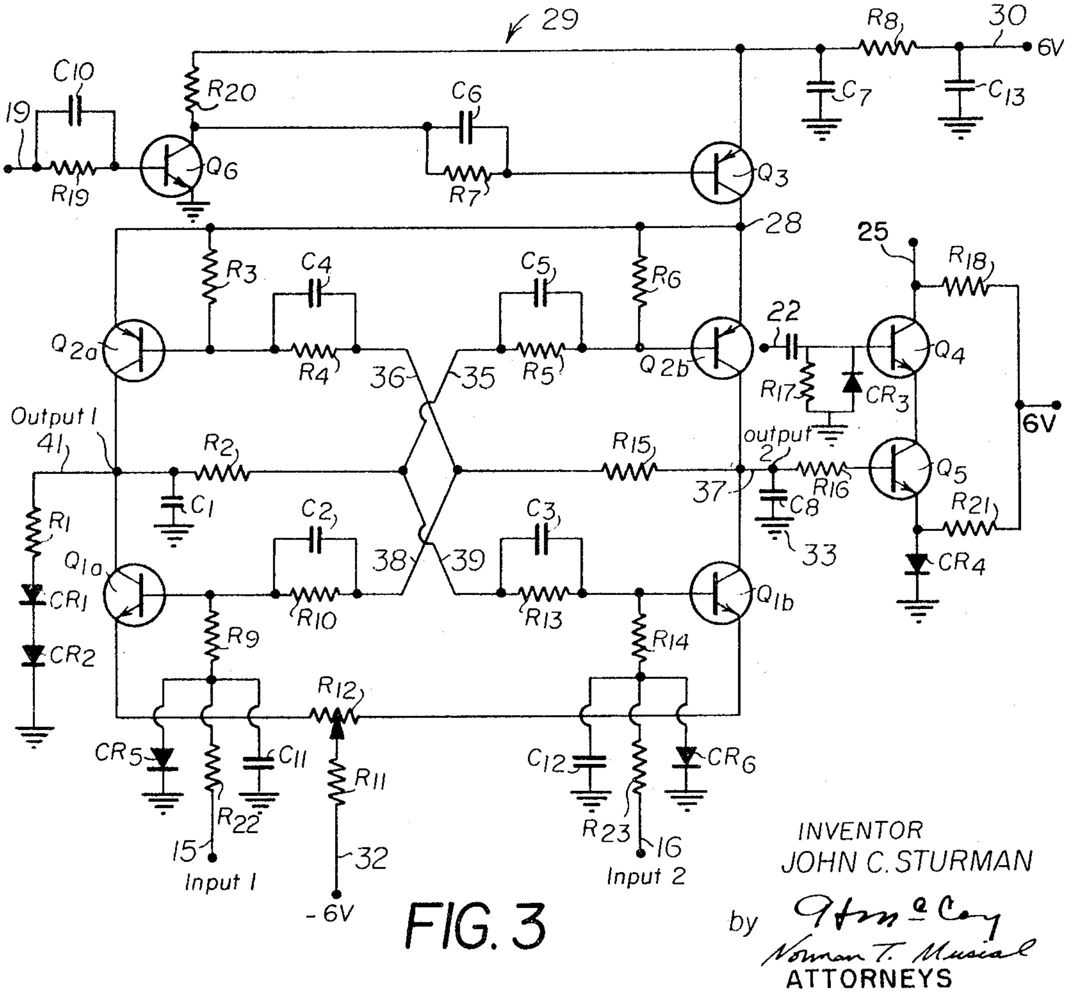
FIGURE 3 is a detailed circuit diagram the comparator circuit of the present invention.

Referring now to the drawings, a preferred form of the comparator circuit of the present invention is designated generally by the reference character 11 in FIGURES 1, 2. In FIGURE 1, two unknown voltages or currents to be compared are introduced to the inputs of a conventional low level differential amplifier 12 via conductors 13, 14. In the comparison system shown, two unknown voltages (or currents) may be compared or an unknown voltage may be compared against a known reference voltage. The differential amplifier 12 shown in FIG. 2 amplifies the difference between the unknown voltages on the conductors 13, 14 and provides this amplified difference to inputs 1, 2 of the comparator circuit 11 via conductors 15, 16 as shown in FIG. 3.

A conventional AND circuit 20 has two inputs connected to the input conductors 13, 14 and an output connected to a first delay circuit 17 via a conductor 18. The AND circuit 20 provides a means of indicating to the delay circuit 17 that the voltage (or current) signals to be compared are presented at both inputs. The delay circuit 17 is a conventional single-shot multivibrator which produces a positive voltage pulse on its output connected to a conductor 19 a short period, for example, 700 microseconds, after an input signal is introduced at its input via conductor 18. A positive voltage signal appearing on the conductor 19 is introduced to a pulse controlled input of the comparator circuit 11 and also to the input of a second delay circuit 21. The positive pulse introduced to the pulse controlled input of the comparator circuit 11 turns on the comparator circuit 11 for the duration of the positive pulse to cause it to make a comparison of the two voltages presently introduced at its two inputs. The delay circuit 21 is a conventional, single-shot multivibrator which produces a positive output pulse to its output conected to a conductor 22 a very short period, for example 50 microseconds, after an input pulse is introduced to its input on conductor 19.

The system shown in FIGURE 1 determines whether the input voltage introduced at input 1 is larger or smaller than the input voltage introduced at input 2. If the voltage at input 1 is larger than that at input 2, then a volage signal appears at an output of the comparator connected to a conductor 23. If the input voltage signal on the input 1 is lower than that on input 2, then no voltage signal appears at the output connected to the conducor 23. The conducor 23 and a conductor 22 are connected to the inputs of a NAND circuit 24. The NAND circuit 24 produces an output on a conductor 25, 50 microseconds after the comparator circuit 11 is turned on by the first delay circuit 17 provided the comparator 11 provides an output voltage signal on the conductor 23 indicating that the input 1 is greater than the input 2.

Referring to FIGURE 2, the basic comparator circuit 11 includes effectively two amplifier sections 5, 6 having their inputs connected to opposite outputs of a differential amplifier section 7. Feedback circuits 8, 9 connect the outputs $O_1$, $O_2$ of the amplifiers to the opposite side inputs $I_{2g}$, $I_1$ respectively of the differential amplifier 7.

Referring to FIGURE 3, the comparator circuit 11 comprises NPN transistors Q1*a* and Q1*b* connected to form active elements of a balanced circuit which functions effectively as the differential amplifier 7, and PNP transistors Q2*a* and Q2*b* which form effectively the two separate, single stage amplifiers 5 and 6, as shown in FIG. 2. NPN transistors Q3 and Q6 are provided and form a gating circuit 29 with resistors R19, R20, R7 and capacitors C6, C10 for conecting the emitters of transistors Q2*b* and Q2*a* which are conected to a voltage point 28, to a positive 6-volt voltage supply provided on conductor 30 in response to a positive input pulse provided on conductor 19 from the delay circuit 17. Thus, normally the 6-volt power supply connected to conductor 30 which provides normal operation power to the circuit is not applied to voltage point 28 except when a comparison is to be made, as indicated by the positive pulse provided to the conductor 19. A negative 6-volt supply is continuously provided to a conductor 32 connected through a resistor R11 to be movable tap of a balancing potentiometer R12. When power is applied to the circuit at point 28 by turning on the gate circuit 29, the comparator circuit 11 will assume one of two stable states, the particular stable state being dependent upon the relative magnitudes of the inputs supplied on input conductors 15, 16.

The input voltages (or currents) to be compared as supplied on input conductors 15, 16 flow through resistors R22, R9 to the base of the transistor Q1*a* and through resistors R23, R14 to the base of the transistor Q1*b*, respectively. When no positive voltage is applied to the comparator circuit via the gating circuit 29, there can be no collector current flow in the transistors Q1*a*, Q1*b* so that their emitter currents are the same as their base currents and flow to the negative power supply on the conductor 32 through the balancing potentiometer R12 and the resistance R11. The balancing potentiometer R12 is adjusted to compensate for small differences between the left-hand and right-hand halves or sides of the comparator circuit which must be electricaly identical for optimum circuit performance.

When the positive power supply is provided to the comparator circuit 11 by the gating circuit 29 in response to a positive pulse on the conductor 19 from the delay circuit 17, then the transistors Q1*a*, Q1*b* are slightly forward biased. The forward biased signals occurring at the collectors of the transistors Q1*a*, Q1*b* are coupled to the bases of transistors Q2*b*, Q2*a*, respectively. The coupling between the collector of transistor Q1*a* and the base of transistor Q2*b* is through a network comprising a resistor R2, a conductor 25, a resistor R5 and a capacitor C5. The coupling circuit between the collector of the transistor Q1*b* and the base of the transistor Q2*a* is through the network comprising a resistor R15, conductor 36, and resistor R4 and a capacitor C4. Energization of the circuit at point 28 by the positive power supply forces the comparator circuit 11 to assume one of its two stable states. In one stable state, the transistors Q1*a* and Q2*b* are saturated and transistors Q1*b* and Q2*a* are cut off. If the other stable state, these conditions are exactly reversed. Which set of transistors will become saturated or turned on is determind by which of the transistors Q1*a*, Q1*b* have the greater base current at the instant the power supply is pulsed on by the gate circuit 29. The particular one of the input transistors, Q1*a*, Q1*b* having the larger base current will draw more collector current at the time the positive power supply is provided to the comparator circuit. For example, if the voltage (or current) at the input conductor 15 is larger than that on the input conductor 16, then the collector current of transistor Q1*a* is greater than the collector current of transistor Q1*b*. The transistor Q2*b*, which is diagonally-opposite of transistor Q1*a*, has greater base current than the transistor Q2*a* and consequently the collector of the transistor Q2*b* draws increasing current. The collector of the transistor Q2*b* is connected to the output 2 on conductor 37 and increases with increased collector current. A capacitor C8 is connected between the output 2 and a ground point 33. A rise in voltage on the collector of transistor Q2*b* is coupled back to the diagonally-opposite input transistor Q1*a* through a feed-back network comprising the resistor R15, a conductor 38, a resistor R10, a capacitor C2. The rise in voltage fed back to the base of the transistor Q1*a* increases its base drive and causes a regenerative action. Similarly, the collector of the transistor Q2*a* as connected to output 1 is connected by a feed-back circuit to the base of the transistor Q1*b* through a network comprising a resistor R2, a conductor 39, a resistor R13 and a capacitor C3.

An increase in collector voltage connected to one of the outputs which tends to turn on the NPN input transistor originally having the greater base current, also turns off the PNP transistor directly above that NPN transistor. In the example given where input 1 on conductor 15 is greater than input 2 on conductor 16, the increase in the collector voltage of transistor Q2*b* which tends to further forward bias the base of the transistor Q1*a* and cause regeneration, also turns off the transistor Q2*a* as the increasing voltage at the output 2 tends to drive the base of the transistor Q2*a* positive through a network comprising the resistor R15, the conductor 36, the resistor R4 and the capacitor C4. Further, since the upper PNP transistors Q2*a*, Q2*b*, act as the collector load for the differentially-connected NPN input transistors Q1*a*, Q1*b* respectively, the turn off of the transistors Q2*a*, or Q2*b* further aids in regeneration. In other words, in the example given, the turn off of the transistor Q2*a*, aids in the regeneration which is turning the transistor Q1*a* fully on. In this way, the particular one of the input transistors Q1*a*, Q1*b* originally having the higher base current (i.e., the transistor with the more positive input voltage), rapidly saturates, clamping its corresponding output to its emitter potential. The other of the input transistors is cut off and its collector voltage and the corresponding output, therefore, goes to the positive supply voltage appearing at the point 28. The two outputs on conductors 37, 41 are therefore complementary.

The NAND circuit comprises NPN transistors Q4, Q5, connected with their emitter-collector circuits in series. A negative going output pulse appears on line 25 when an input pulse from the delay circuit 21 appears at the base of transistor Q4 before termination of the pulse from output 2 appearing at the base of transistor Q5.

In operation, the 700 microsecond delay circuit 17 does not turn the comparator on for several hundred microseconds after the input is applied through the conductors 15, 16 to permit the comparator signals to settle. Preferably, 50 microseconds later, the output from the comparator circuit 11 is sampled by the NAND circuit and a negative output voltage pulse is provided on the conductor 25 when the voltage at input 1 is greater than the voltage at input 2.

The input networks of the comparator circuit 11 provide both limiting and decoupling functions. Capacitors C11, C12 serve to roll off the frequency response of the system thereby reducing high frequency noise pick-up. Resistors R22, R23 serve to decouple the amplifier 12 from the comparator circuit input and thereby prevent amplifier oscillation. Diodes CR5 and CR6 prevent the comparator circuit inputs from going appreciably positive, which tends to occur during amplifier saturation so that the collector voltage of Q1*b* always can go sufficiently negative during the time that it is saturated to keep Q5 cut off and pulses are never produced by the comparator when none should occur.

To achieve very low hysteresis and shift of trigger point with temperature, the comparator circuit is designed with near-perfect symmetry between its two sides or halves. Closely matched dual transistors are used for both the PNP and NPN stages. Resistor R1 and diodes CR1, CR2 are added to the unused output on conductor 41 as a dummy load to maintain balance. Final balancing is accomplished with the potentiometer R12 located in the emitter circuits of the NPN transistors Q1*a*, Q1*b*.

With the above described circuit, hysteresis of the circuit is less than 3.0 millivolts and the temperature drift is approximately 7 millivolts over a temperature range of −20° to plus 80° C. When referred to the input of the differential amplifier, this drift occurs as less than 1 microvolt per degree centigrade. Power consumption of the comparator circuit 11 is 1.2 milliwatts at 25° C. Common mode rejection of the comparator circuit 11 can be improved by replacing the resistor R11 with a transistor so as to provide a constant emitter current to the input transistors Q1*a*, Q1*b*.

Among the many advantages of the present comparator circuit is that it provides a true differential input arrangement along with good common mode rejection. Its pulsed operation gives precise control of the time of comparison and it is compatible with present logic systems in general, particularly those using digital systems. It provides greatly increased sensitivity with very low hysteresis and excellent temperature stability. Its outputs are complementary and of a low impedance. Over all, the system provides a very low power consumption and is particularly usable in control and computor systems used, for example, in satellites and other space vehicles.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A comparator circuit comprising:

(a) first and second input transistors having base elements connected as first and second inputs respectively of the comparator circuit so that an input voltage introduced to an input forward biases its respective input transistor to turn on its emitter-collector circuit;

(b) first and second amplifier transistors having base elements connected to the emitter-collector circuit of the second and first input transistors respectively so that the amplifier transistors are forward biased by conduction of the emitter-collector circuit of their respective input transistors, the emitter-collector circuit of each of said first and second amplifier transistors being connected in series relationship with the emitter-collector circuit of each of said second and first input transistors, respectively;

(c) power supply means connected to the emitter-collector circuits of the amplifier transistors on one side of each of said amplifier transistors;

(d) first and second comparator circuit outputs connected to the other side of the emitter-collector circuits of the first and second amplifier transistors respectively on the other side of each of said amplifier transistors;

(e) feedback circuit means connecting the first and second outputs to the base elements of the second and first input transistors respectively so that as an amplifier transistor is forward biased it further forward biases its respective input transistor to turn its respective input transistor fully on whereby the input transistors compare input signals differentially and the input transistor having the larger input is turned fully on to fully forward bias its respective amplifier transistor so that a voltage signal appears at the output connected to the latter amplifier transistor;

(f) a gating circuit interposed between the power supply means and the comparator circuit, said gating circuit connecting the power supply means to the comparator circuit for the duration of a control pulse introduced to its input so that the input and amplifier transistors are forward biased during said control pulse; and (g) a delay circuit connected to the gating circuit and introducing a control pulse to the input of the gating circuit a predetermined period after input signals are introduced to the first and second inputs of the comparator circuit.

2. The comparator circuit of claim 1 including an output circuit connected to the second output so that an indicating signal is provided by the output circuit only when the input voltage provided to the first input is larger than the input voltage provided to the second input.

3. The comparator circuit of claim 2 wherein a dummy load is connected to the first output to maintain a balanced comparator circuit.

4. The comparator circuit of claim 2 wherein the output circuit includes an NAND circuit having two inputs and an output, a first input of the NAND circuit being connected to the second output of the comparator circuit, a second input of the NAND circuit being connected by a second delay circuit to the input of the gating circuit so that an indicating signal appears at the output of the NAND circuit provided an output signal appears at the second output of the comparator circuit simultaneously with a signal from the second delay circuit which is delayed relative to the control pulse introduced to the input of the gating circuit.

References Cited

UNITED STATES PATENTS

| | | | |
|---|---|---|---|
| 3,010,031 | 11/1961 | Baker | 307—292 X |
| 3,327,140 | 6/1967 | Rockey | 307—235 |
| 3,307,047 | 2/1967 | Narud et al. | 307—291 |

JOHN S. HEYMAN, Primary Examiner

J. D. FREW, Assistant Examiner

U.S. Cl. X.R.

307—291, 292; 328—115, 146, 147, 148